March 18, 1958 G. V. JAKEWAY 2,826,934
KNOB ASSEMBLY FOR VALVES, SWITCHES AND THE LIKE
Filed July 18, 1956

INVENTOR.
Gerald V. Jakeway
BY
Attorney.

United States Patent Office 2,826,934
Patented Mar. 18, 1958

2,826,934

KNOB ASSEMBLY FOR VALVES, SWITCHES AND THE LIKE

Gerald V. Jakeway, Grand Rapids, Mich., assignor to Keeler Brass Company, Grand Rapids, Mich.

Application July 18, 1956, Serial No. 598,630

6 Claims. (Cl. 74—553)

This invention relates to a knob assembly for valves, switches and the like, comprising a body portion and a bezel in which the bezel may be quickly and easily assembled with the body portion and at the same time is very securely positioned and retained thereon.

The main objects of this invention are:

First, to provide a knob or handle assembly for valves, switches and the like including a bezel in which the body or handle portion is formed of molded plastic and the bezel is fixedly and nonrotatably mounted on the body portion without the aid of tools and the assembly constitutes a unitary structure.

Second, to provide a knob assembly having these advantages in which the parts may be economically produced and assembled and the bezel is securely retained merely by sleeving it upon the stem of the body portion.

Objects relating to details and economies of the invention will appear from the description to follow. The inveniton is defined and pointed out in the claims.

A preferred embodiment of the invention is illustrated in the accompanying drawing, in which:

Fig. 1 is a side elevational view of a knob assembly of my invention shown in operative relation to the stem of a valve or the like.

In the embodiment of my invention illustrated 1 represents the wall of a stove or the like and 2 the spindle of a valve or switch.

The knob assembly of my invention comprises a body portion 3 desirably molded integrally of plastic and constituting a hand piece. The body portion has a rearwardly facing recess 4 and a spindle engaging stem 5 disposed centrally of the recess and projecting therefrom.

Figure 1:
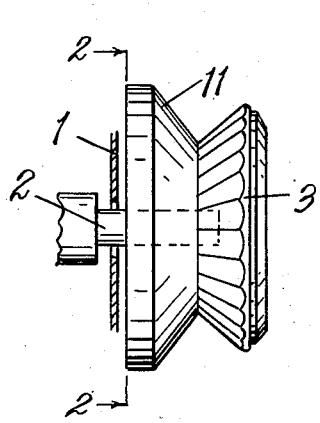
Figure 2:
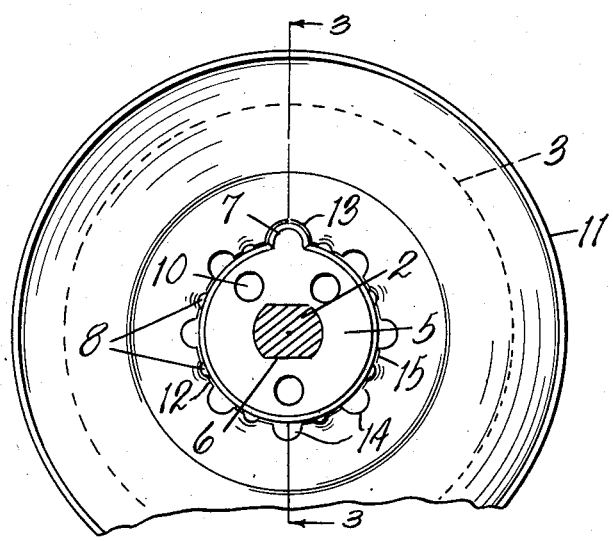
Fig. 2 is an enlarged fragmentary rear elevational view of the knob assembly on a line corresponding to line 2—2 of Fig. 1.
Figure 4:
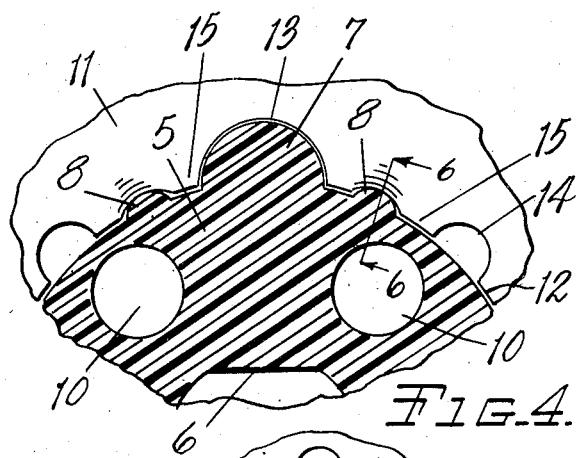
Fig. 4 is an enlarged fragmentary view on a line corresponding to line 4—4 of Fig. 3.

In the embodiment illustrated the stem has a longitudinal non-circular recess 6 conformed to fit the spindle 2. The stem is provided with a longitudinal extending rib like bezel engaging lug 7 and with a plurality of laterally or angularly spaced relatively narrow longitudinally disposed ridges 8. The openings 10 shown in Figs. 2 and 4 are core holes and are not functional assembly.

The bezel 11, desirably formed as a sheet metal stamping, has a central opening 12 adapted to receive the stem. The edge of the opening is provided with a notch like recess 13 adapted to receive the rib or lug 7 which prevents relative rotative movement of the bezel and body portion. The edges of the opening of the bezel are provided with a plurality of angularly spaced notches 14 which with the notch 13 defining a plurality of inwardly projecting tooth like portions 15 positioned to engage the ridges 8 when the bezel is sleeved upon the stem.

Figure 3:
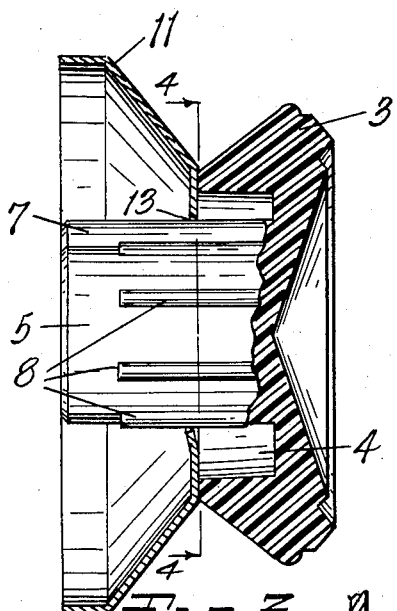
Fig. 3 is an enlarged fragmentary view partially in section on a line corresponding to line 3—3 of Fig. 2.
Figure 6:
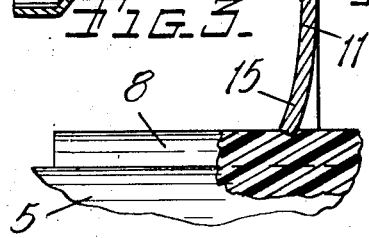
Fig. 6 is an enlarged fragmentary view partially in section on a line corresponding to line 6—6 of Fig. 4.
Figure 5:
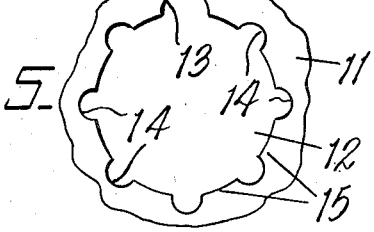
Fig. 5 is a fragmentary view of the bezel.

The diameter of the opening in the bezel is such that when the bezel is sleeved upon the stem the tooth like portions 15 thereof clutchingly engage the ridges 8 and are deflected rearwardly, as is best shown in Fig. 6. The edges of the portions 15 embeddingly engage the ridges when the bezel is seated against the inner end of the body portion as is shown in Fig. 3. With the bezel portions 15 in locking engagement with the ridges the bezel is very securely retained on the stem and this results merely from sleeving it over the stem. The rib 7 prevents rotative movement of the bezel and the body portion so that the bezel, which is commonly provided with suitable indicia not illustrated, is nonrotatable and fixedly secured to the body portion.

The body portion of the knob assembly may be any desired configuration. With the bezel and body member assembled they constitute a unit. It is very difficult, in fact, practically impossible to disassemble them without distorting the bezel. The bezel and body portion may be assembled on the job to be applied to the spindle or they may be previously assembled as may be desired.

The bezel may be of desired ornamental design and it serves the double purpose of providing a finish and carrying the desired indicia which I have not illustrated as this is varied and it is a well known practice to provide bezels with indicia.

I have illustrated and described a very simple and practical embodiment of my invention which I believe will enable those skilled in the art to embody or adapt as may be desired.

Having thus described the invention, what is claimed as new and is desired to be secured by Letters Patent is:

1. A knob assembly comprising a body portion of plastic and constituting a hand piece and having a rearwardly opening recess in its inner side, and a stem disposed centrally of and projecting from said recess, the stem having a longitudinally extending bezel engaging rib and a plurality of angularly spaced longitudinal ridges, said stem being recessed to receive a spindle, and a bezel having a stem receiving opening therein, the edge of the opening being notched to receive said rib on said stem and having a plurality of angularly spaced notches defining a plurality of inwardly projecting tooth-like portions aligned with said ridges and telescopingly and slidably engaged therewith with the teeth deflected rearwardly and having edge portions thereof embeddingly engaged with the ridges with the bezel in engagement with the inner side of said body portion.

2. A knob assembly comprising a body portion constituting a hand piece and having a rearwardly projecting spindle engaging stem, the stem having a longitudinally extending bezel engaging rib and a plurality of laterally spaced longitudinal ridges, and a bezel having a stem receiving opening therein, the edge of the opening being notched to receive said rib on said stem and having a plurality of inwardly projecting tooth like portions telescopingly and clutchingly engaged with said ridges and deflected rearwardly when the bezel is in engagement with the inner side of said body portion.

3. A knob comprising a body portion constituting a hand piece and having a rearwardly projecting spindle engaging stem, the stem having a longitudinally extending bezel engaging rib, and a plurality of angularly and uniformly spaced longitudinal ridges of relatively small cross section as compared to the rib, and a bezel having a stem receiving opening therein sleeved upon said stem and conformed to receive said rib on said stem and having a plurality of angularly spaced yieldable stem engaging elements slidably engaging said ridges as the bezel is forced to seated position with the edges of said elements deflected rearwardly and in embedded retaining engagement with the ridges.

4. A knob assembly comprising a body portion of plastic constituting a hand piece and having a rearwardly projecting stem recessed to receive a spindle and having a bezel engaging lug and a plurality of angularly and uniformly spaced longitudinal ridges, and a bezel having a stem receiving opening therein, the edges of the opening being notched to receive said lug on said stem and having a plurality of angularly spaced notches defining a plurality of projections clutchingly engaged with said ridges with the projections deflected rearwardly and having edge portions thereof embeddingly engaged with the ridges.

5. A knob assembly comprising a body portion of plastic constituting a hand piece and having a rearwardly projecting spindle engaging stem, the stem having a bezel engaging lug and a plurality of laterally spaced elongated relatively narrow longitudinally disposed projections, and a bezel sleeved upon said stem and conformed to engage said lug, the edge of the stem receiving opening having a plurality of projections clutchingly and embeddingly engaged in said raised portions with the bezel disposed against the inner end of the body portion.

6. A knob assembly comprising a body portion constituting a hand piece and having a rearwardly projecting spindle engaging stem, the stem having a bezel engaging lug and a plurality of laterally spaced elongated relatively narrow longitudinally disposed projections, and a bezel sleeved upon said stem and conformed to engage said lug, the edge of the stem receiving opening of the bezel having a plurality of projections clutchingly and embeddingly engaging said projection.

References Cited in the file of this patent

UNITED STATES PATENTS

| | | |
|---|---|---|
| 1,526,500 | Kasch | Feb. 17, 1925 |
| 1,552,052 | Danielson | Sept. 1, 1925 |
| 1,825,364 | Ross | Sept. 29, 1931 |
| 1,604,583 | Torre | July 22, 1952 |